(12) United States Patent
Lee et al.

(10) Patent No.: US 9,539,469 B2
(45) Date of Patent: Jan. 10, 2017

(54) SWIMMING RACE SYSTEM, SWIMMING RACE METHOD, METHOD OF MANAGING WATER QUALITY, AND DISPLAY APPARATUS

(71) Applicant: SAMSUNG ELECTRONICS CO., LTD., Suwon-si (KR)

(72) Inventors: So-la Lee, Seoul (KR); Dong-jin Na, Goyang-si (KR); Dong-seok Lee, Suwon-si (KR); Hyun-mook Choi, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/577,395

(22) Filed: Dec. 19, 2014

(65) Prior Publication Data

US 2015/0209614 A1 Jul. 30, 2015

(30) Foreign Application Priority Data

Jan. 28, 2014 (KR) ........................ 10-2014-0010307

(51) Int. Cl.
*A63B 24/00* (2006.01)
*A63B 31/00* (2006.01)
(Continued)

(52) U.S. Cl.
CPC ................ *A63B 31/00* (2013.01); *G06F 3/14* (2013.01); *G06K 9/00342* (2013.01);
(Continued)

(58) Field of Classification Search
CPC . A63B 71/0686; A63B 71/0619; A63B 69/12; A63B 24/0021; A63B 24/02; A63B 24/00; A63B 24/0062; A63B 31/00; G06F 3/1446; G06F 3/14; G06F 3/147; G06F 3/003; G09G 3/003; G09G 2370/02; G09G 2380/08
See application file for complete search history.

(56) References Cited

U.S. PATENT DOCUMENTS 4,932,045 A * 6/1990 Kasoff ............... A63B 71/0686
377/24.2
5,813,945 A * 9/1998 Bernacki .............. A63B 21/153
434/247
(Continued)

FOREIGN PATENT DOCUMENTS

GB 2494842 A 3/2013
JP 2001-037944 A 2/2001
(Continued)

OTHER PUBLICATIONS

Communication dated Jul. 17, 2015, issued by the European Patent Office in counterpart European Application No. 14200461.3.
(Continued)

*Primary Examiner* — Glenn Richman
(74) *Attorney, Agent, or Firm* — Sughrue Mion, PLLC

(57) ABSTRACT

A display system comprising a user terminal apparatus configured to transmit a swimming image to a display apparatus, the display apparatus configured to reproduce the swimming image received from the user terminal apparatus, and a sensing apparatus configured to sense, while the user is swimming, user location information in real time, and transmit the sensed user location information to the user terminal apparatus or the display apparatus. The user terminal apparatus or the display apparatus displays swimming information of the user based on the received user location information.

13 Claims, 17 Drawing Sheets

(51) Int. Cl.
*G06K 9/00* (2006.01)
*G06F 3/14* (2006.01)
*G06F 3/147* (2006.01)
*G09G 3/00* (2006.01)

(52) U.S. Cl.
CPC ............ *G06F 3/147* (2013.01); *G06F 3/1446* (2013.01); *G09G 3/003* (2013.01); *G09G 2370/02* (2013.01); *G09G 2380/08* (2013.01)

(56) References Cited

U.S. PATENT DOCUMENTS

| | | | | |
|---|---|---|---|---|
| 6,870,466 | B2* | 3/2005 | Rust | A63B 24/0021 340/309.16 |
| 7,029,170 | B2* | 4/2006 | Bailey | A63B 69/12 340/323 R |
| 7,184,370 | B2* | 2/2007 | Rogacki | A63B 71/0619 368/107 |
| 7,257,517 | B2* | 8/2007 | Shitan | A63B 69/12 702/182 |
| 7,358,456 | B1* | 4/2008 | Julian | A63B 69/12 200/512 |
| 7,641,590 | B2* | 1/2010 | Chan | A63B 71/0686 434/247 |
| 9,217,634 | B1* | 12/2015 | Firmin | G06N 99/005 |
| 2003/0189484 | A1 | 10/2003 | Rust et al. | |
| 2004/0218786 | A1 | 11/2004 | Murakoshi et al. | |
| 2005/0197541 | A1 | 9/2005 | Shitan | |
| 2005/0243651 | A1 | 11/2005 | Balley | |
| 2010/0304934 | A1 | 12/2010 | Woodson | |

FOREIGN PATENT DOCUMENTS

| | | |
|---|---|---|
| JP | 2002-346020 A | 12/2002 |
| JP | 2009-074840 A | 4/2009 |
| JP | 2010-008102 A | 1/2010 |
| KR | 10-2001-0027533 A | 4/2001 |
| KR | 2010-0124640 A | 11/2010 |
| KR | 10-1036429 B1 | 5/2011 |
| KR | 10-1212629 B1 | 1/2013 |
| KR | 10-2013-0100933 A | 9/2013 |
| WO | 01/07124 A1 | 2/2001 |
| WO | 2011/161468 A3 | 12/2011 |
| WO | 2012107620 A1 | 8/2012 |

OTHER PUBLICATIONS

Communication dated Apr. 11, 2016 issued by the European Patent Office in counterpart Application No. 14 200 461.3.

* cited by examiner

FIG. 13
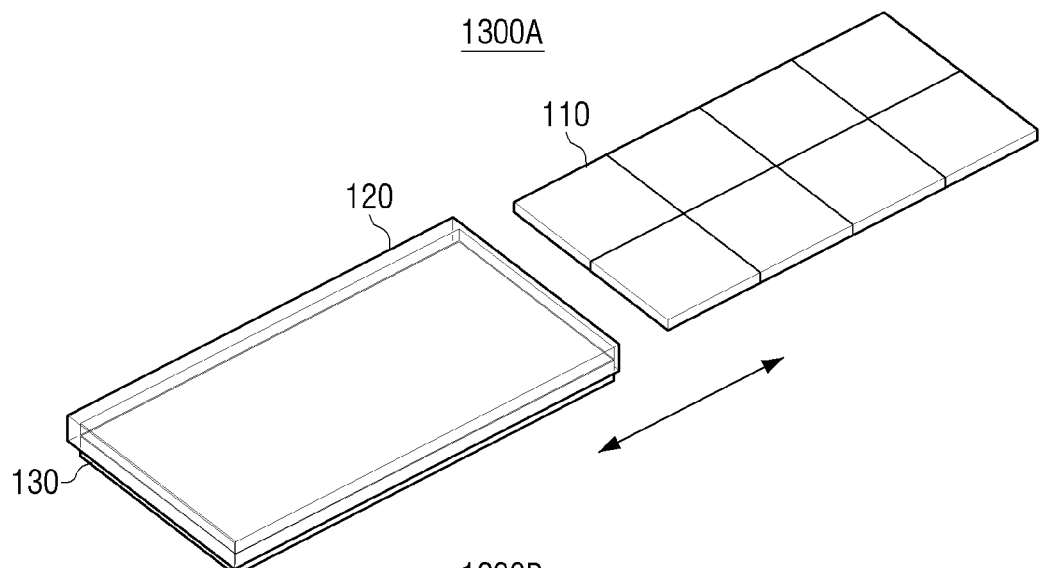
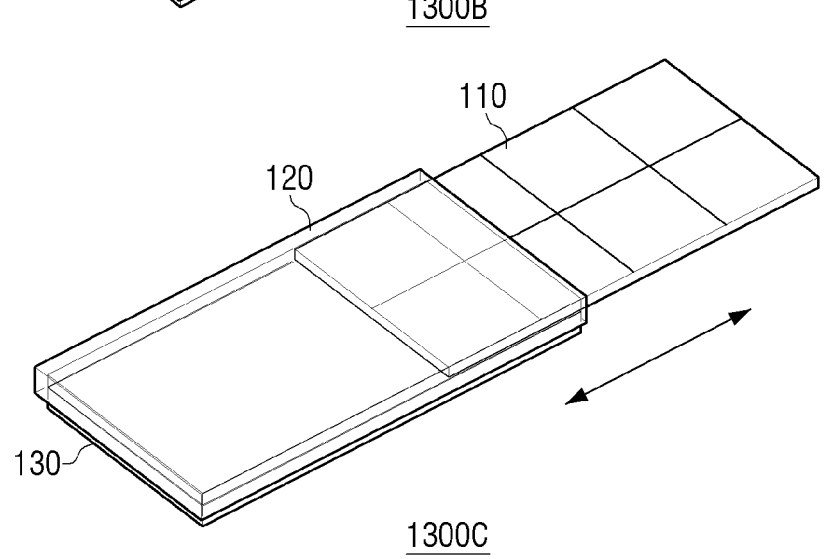
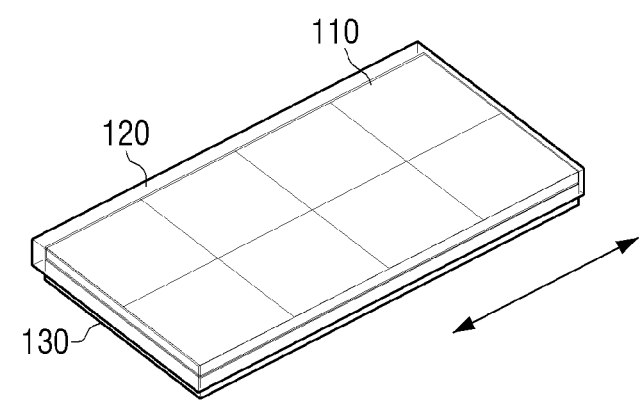

SWIMMING RACE SYSTEM, SWIMMING RACE METHOD, METHOD OF MANAGING WATER QUALITY, AND DISPLAY APPARATUS

CROSS-REFERENCE TO RELATED APPLICATION

This application claims priority from Korean Patent Application No. 10-2014-0010307, filed on Jan. 28, 2014, in the Korean Intellectual Property Office, the disclosure of which is incorporated herein by reference in its entirety.

BACKGROUND

1. Field

Apparatuses and methods consistent with exemplary embodiments relate to a swimming system, and more particularly, to a swimming system using a display apparatus.

2. Description of the Related Art

Video walls are technology for representing one image simultaneously using a plurality of display apparatuses for the purpose of advertisement, entertainment, sports, broadcastings, or the like.

For example, the video walls may be used to represent one entire image by simultaneously displaying the same image or displaying different images, through the display apparatuses constituting the video wall, in exhibitions.

The video wall technology may be applied to various fields. In particular, there is a need for a method for applying advanced video wall technology to the sport or game fields.

SUMMARY

One or more exemplary embodiments may overcome the above disadvantages and other disadvantages not described above. However, it is understood that one or more exemplary embodiment are not required to overcome the disadvantages described above, and may not overcome any of the problems described above.

One or more exemplary embodiments are to apply advanced video wall technology to the sport or game fields.

Specifically, one or more exemplary embodiments are to provide a swimming system which provides the same experiences that a user swims with other users using a display apparatus and a user location sensing apparatus.

According to an aspect of an exemplary embodiment, there is provided a display system. The display system may include: a user terminal apparatus configured to transmit a swimming image to a display apparatus; the display apparatus configured to reproduce the swimming image received from the user terminal apparatus; and a sensing apparatus configured to sense, while the user is swimming, user location information in real time, and transmit the sensed user location information to the user terminal apparatus or the display apparatus. The user terminal apparatus or the display apparatus may display swimming information of the user based on the received user location information.

The display apparatus may include at least one selected from the group consisting of a camera configured to capture a location of the user, a magnetic field sensor configured to sense a magnetic tag worn by the user, and an ultrasonic sensor configured to sense an ultrasonic wave reflected from a body of the user.

The user terminal apparatus or the display apparatus may calculate one or more swimming statistics of the user based on the received user location information, and display the calculated swimming statistics.

The user terminal apparatus or the display apparatus may calculate comparative data by comparing one or more swimming statistics corresponding to the swimming image selected by the user input with the one or more swimming statistics of the user calculated based on the received user location information, and display the calculation result.

The display apparatus may be installed on an inner wall of a swimming pool of a swimming place, and the user terminal apparatus may be installed on at least one of a wall and floor of the swimming pool.

The display apparatus may include at least one display unit configured to display an image; a transparent member configured to cover a front of the at least one display unit; and a frame unit configured to affix to the transparent member, forming an inner space between the transparent member and the frame unit.

The at least one display unit may be installable into the inner space formed between the transparent member and the frame unit.

The at least one display unit may be removable from the inner space.

The transparent member may be tempered glass or reinforce plastic.

The display apparatus may further include a leak sensor configured to detect water permeating into the inner space.

According to an aspect of an exemplary embodiment, there is provided a display method. The display method may include: transmitting a swimming image to a display apparatus; reproducing, by the display apparatus, the swimming image received from the user terminal apparatus; sensing, while a user is swimming, user location information in real time and transmitting the sensed user location information to the user terminal apparatus or the display apparatus; and displaying a swimming information of the user based on the received user location information in the user terminal apparatus or the display apparatus.

The sensing of the user location information may be performed using at least one selected from the group consisting of a camera configured to capture a location of the user, a magnetic field sensor configured to sense a magnetic tag worn by the user, and an ultrasonic sensor configured to sense an ultrasonic wave reflected from a body of the user.

The user terminal apparatus or the display apparatus may calculate a one or more swimming statistics of the user based on the received user location information, and display the calculated swimming statistics.

The user terminal apparatus or the display apparatus may calculate comparative data by comparing one or more swimming statistics corresponding to the swimming image selected by the user input with the one or more swimming statistics of the user calculated based on the received user location information, and display the calculation result.

The display apparatus may be installed on at least one of an inner wall and a pool of a swimming pool of a swimming place, and the user terminal apparatus may be installed on a wall of the swimming place.

According to an aspect of an exemplary embodiment, there is provided a method of managing water quality. The method may include: detecting floating material by a water-quality measurement sensor; determining a location in which the detected floating material is more than a reference value; and displaying a preset image in a display region of a display apparatus corresponding to the location.

The water-quality measurement sensor may include at least one selected from the group consisting of a bio sensor, an ultrasonic sensor, a pH sensor, and a thermometer.

The water-quality measurement sensor may be the ultrasonic sensor, and the ultrasonic sensor may be installed in a wall of a swimming pool.

The displaying may include changing a color of the display region of the display apparatus corresponding to the location.

According to an aspect of an exemplary embodiment, there is provided a display apparatus: The display apparatus may include: at least one display unit configured to display an image; tempered glass configured to cover a front of the at least one display unit; a frame unit configured to affix to the tempered glass, forming an inner space between the tempered glass and the frame unit; and a leak sensor configured to detect water permeating the inner space formed by the tempered glass and the frame unit.

According to an aspect of an exemplary embodiment, there is provided a display system including a waterproofed display apparatus configured to be installed on at least one of an interior wall and a floor of a pool; and a controller configured to control the display.

The display system may further include a sensing apparatus configured to sense, while a user is in the pool, user location in real time. The controller may be further configured to change an image displayed on the display apparatus based on the sensed user location.

The controller may be further configured to control a movement of the image displayed on the display apparatus based on the user's location.

The controller may be further configured to calculate one or more swimming statistics based on the sensed user location and to control the display apparatus to display the one or more swimming statistics.

The above-described various exemplary embodiments may install a display apparatus under water, display various images under water using the display apparatus, and provide various pieces of content using the display apparatus.

Specifically, the above-described various exemplary embodiments may provide the same experience that a user swims with other users using the display apparatus and a user location sensing apparatus.

Additional aspects and advantages of the exemplary embodiments will be set forth in the detailed description, will be obvious from the detailed description, or may be learned by practicing the exemplary embodiments.

BRIEF DESCRIPTION OF THE DRAWING FIGURES

The above and/or other aspects will be more apparent by describing in detail exemplary embodiments, with reference to the accompanying drawings, in which:

FIG. 13 is a view illustrating an example in which a display unit is inserted into an inner space formed by a transparent member and a frame unit according to an exemplary embodiment;

DETAILED DESCRIPTION OF THE EXEMPLARY EMBODIMENTS

Figure 1:
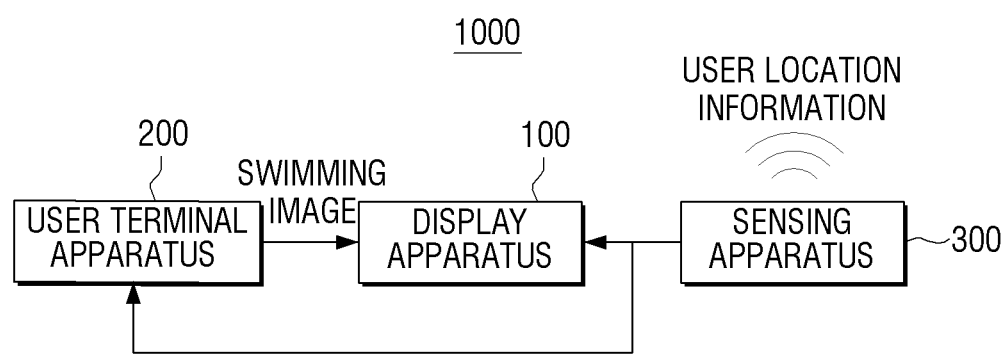
FIG. 1 is a block diagram illustrating a swimming system according to an exemplary embodiment.

Hereinafter, exemplary embodiments will be described in more detail with reference to the accompanying drawings.

In the following description, the same reference numerals are used for the same elements when they are depicted in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, functions or elements known in the related art are not described in detail since they would obscure the exemplary embodiments with unnecessary detail.

FIG. 1 is a block diagram illustrating a swimming system 1000 according to an exemplary embodiment.

Referring to FIG. 1, a swimming system 1000, i.e. a display system, according to an exemplary embodiment includes a user terminal apparatus 200, a display apparatus 100, and a sensing apparatus 300.

The user terminal apparatus 200 is configured to transmit a swimming image to the display apparatus 100. The image may be selected by a user input. Specifically, a user may select the swimming image through a user interface (not shown) provided by the user terminal apparatus 200. In one exemplary embodiment, the user terminal apparatus 200 may display objects for the swimming images, such as icons, and a user may select a desired object through a touch screen. The swimming image may be a moving image of other people, such as swimmers, or an image of the user who swims in a swimming pool. In response to a desired swimming image being selected by the user, the user terminal apparatus 200 transmits the selected swimming image to the display apparatus 100.

In another exemplary embodiment, the display apparatus 100 and the user terminal apparatus 200 may share swimming image data through a server such as a cloud. In response to a desired swimming image being selected by the user, only identification information for the selected swimming image is transmitted to the display apparatus 100. The display apparatus 100 may display the selected swimming image using the identification information.

The user terminal apparatus 200 may include, as non-limiting examples, at least one selected from the group consisting of a smart phone, smart glasses, a tablet personal computer (PC), a smart watch, and a laptop computer which are carried by the user. Alternatively, the user terminal apparatus may include a separate display apparatus installed outside a swimming pool.

The display apparatus 100 reproduces the swimming image received from the user terminal apparatus 200. The image may be displayed in response to a start of a user swimming. The display apparatus 100 may display various images. As non-limiting examples, various moving images of the sea, the space, the sky, or the like are displayed, and thus a beautiful appearance of the swimming pool and various experiences of the user may be provided. The display apparatus 100 may be installed on an inner wall of the swimming pool, and may provide a similar experience to swimming with other people. If the display apparatus 100 is installed on the inner wall of the swimming pool, the display apparatus 100 should be waterproofed, and a detailed structure of the display apparatus according to an exemplary embodiment will be described later.

The sensing apparatus 300 is configured to sense user location information in real time, and transmit the sensed user location information to the user terminal apparatus 200 or the display apparatus 100.

The swimming system 1000 may further include a controller (not shown) configured to an operation of the display apparatus 100 and the sensing apparatus 300. The controller may change an image displayed on the display based on the sensed user location. the controller may further control a movement of the image displayed on the display apparatus based on the user's location. The controller may further be configured to calculate one or more swimming statistics based on the sensed user location and to control the display apparatus to display the one or more swimming statistics. The controller may be a hardware, software, or a combination of hardware and software, such as, as a non-limiting example, a general purpose processor loaded with software capable of performing the various functionalities of the controller.

The user terminal apparatus 200 or the display apparatus 100 may display a location of the user based on the received user location information. The display apparatus 100 may receive record information for the selected swimming image from the user terminal apparatus 200 and display the received record information. Further, the display apparatus may calculate a pace or record time of the user, and display the calculated pace record time on a screen. The display apparatus 100 may calculate comparative data by comparing a pace or record time corresponding to the swimming image selected by the user input with the pace or record time of the user calculated based on the received user location information, and display the calculated comparative data. At this time, the display apparatus may display a difference between the paces or record times of the user and the swimming image, or the like using an object such as an arrow. Further, in response to the user quitting swimming, the display apparatus 100 may calculate final swimming record information of the user, such as, as non-limiting examples, total time, average speed, and total time, store the calculated swimming record information, compare the record information of the user with record information of the swimming image to generate comparative data or the like, and display the comparative data.

To this end, in response to the swimming image being first selected through the user terminal apparatus, the selected swimming image with record information corresponding to the selected swimming image may be transmitted to the display apparatus 100. However, in response to the user terminal apparatus 200 calculating the comparative data, it is unnecessary for the record information corresponding to the selected swimming image to be transmitted to the display apparatus 100.

The sensing apparatus 200 may be implemented with at least one among a camera (see 300-1 of FIG. 2) configured to capture a location of the user, a magnetic field sensor (see 300-2 of FIG. 3) configured to sense a magnetic tag worn by the user, an ultrasonic sensor (see 300-3 of FIG. 4) configured to sense an ultrasonic wave reflected by a body of the user, and a radio frequency (RF) reader (not shown) configured to sense an RF signal. Hereinafter, examples of the sensors will be described.

Figure 2:
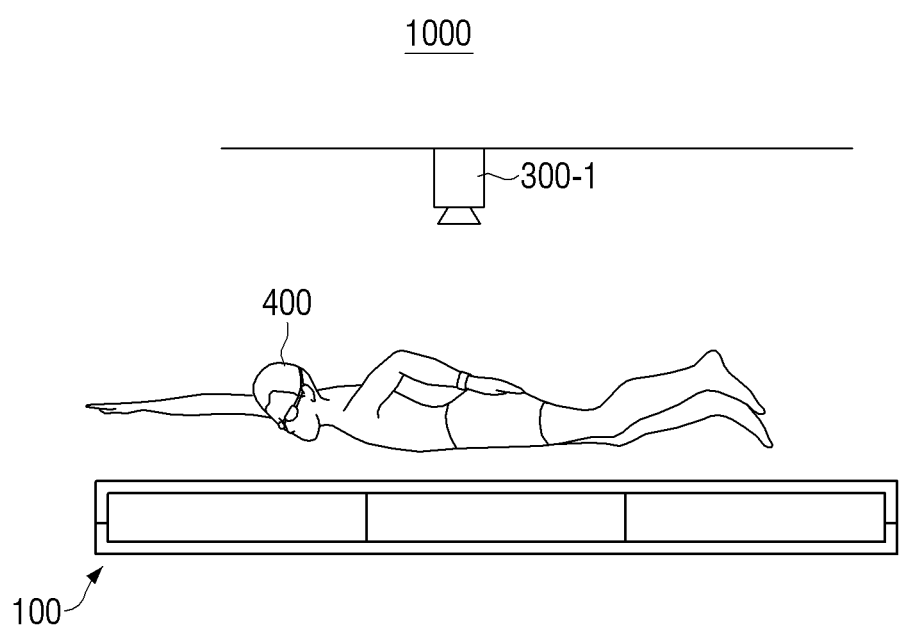
FIG. 2 is a view illustrating a method of sensing a location of a user using a camera according to an exemplary embodiment.

FIG. 2 is a view illustrating a method of sensing a location of a user using a camera according to an exemplary embodiment.

Referring to FIG. 2, the swimming system 1000 the camera 300-1 may be installed in a location which may capture all swimming trajectories of the user, such as, as a non-limiting example, a ceiling above a swimming pool. The swimming trajectory of the user is captured through the camera 300-1. The capturing may be performed in real time, and thus swimming speed and swimming record information of the user may be obtained through the captured image. The camera 300-1 transmits the captured image (a moving image) to the display apparatus 100 or the user terminal apparatus 200. Although only one camera 300-1 is shown, this is merely an example, and exemplary embodiments may have two or more cameras.

Figure 3:
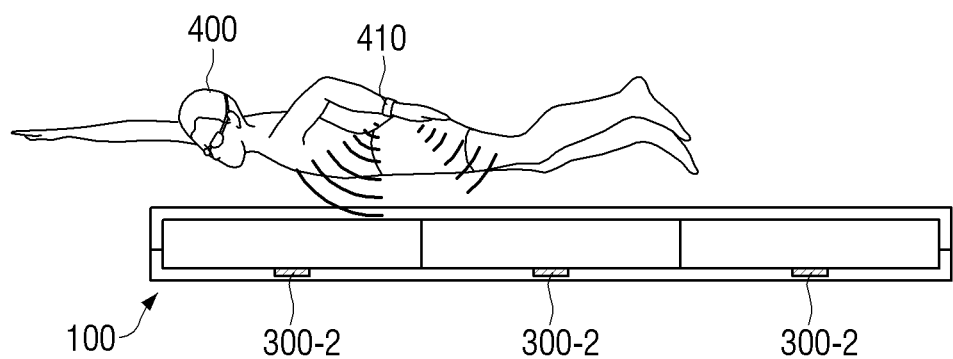
FIG. 3 is a view illustrating a method of sensing a location of a user using a magnetic field sensor according to another exemplary embodiment.

FIG. 3 is a view illustrating a method of sensing a location of a user using a magnetic field sensor according to another exemplary embodiment.

As illustrated in FIG. 3, the swimming system 1000 may include magnetic field sensors 300-2, and a user 400 may wear an object 410 having a magnetic tag in a part (for example, a wrist) of a body of the user 400. The magnetic field sensors 300-2 may sense a location of the user by detecting the object 410 having the magnetic tag, and detecting a distance between the object 410 and the magnetic field sensors 300-2 based on an intensity of a magnetic field. The sensing is performed in real time, and thus the swimming speed and swimming record information may be obtained through the obtained information. The magnetic field sensors 300-2 transmit the sensing information to the display apparatus 100 or the user terminal apparatus 200.

Figure 4:
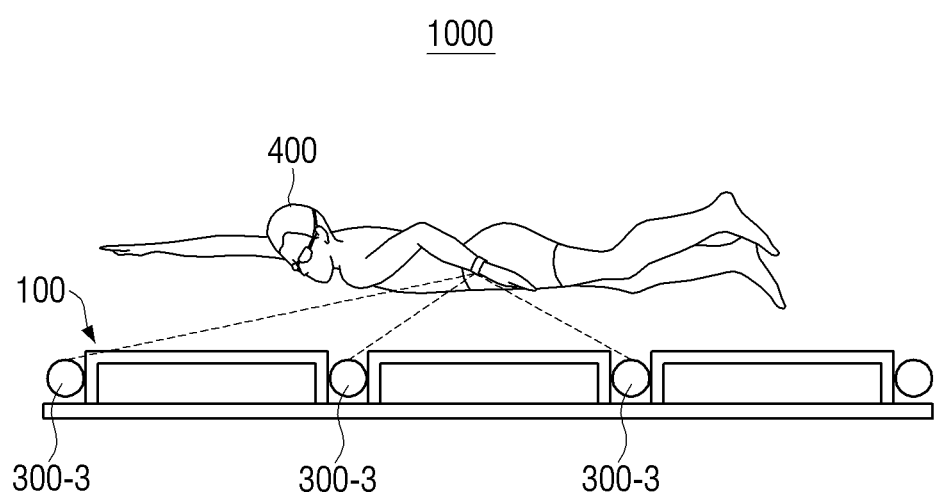
FIG. 4 is a view illustrating a method of sensing a location of a user using an ultrasonic sensor according to another exemplary embodiment.

FIG. 4 is a view illustrating a method of sensing a location of a user using an ultrasonic sensor according to another exemplary embodiment.

The swimming system 1000 include ultrasonic sensors 300-3. The swimming system 1000 may sense a distance to an object, which reflects an ultrasonic wave, in front of the ultrasonic sensors 300-3. The ultrasonic sensors 300-3 emit an ultrasonic wave, and sense the ultrasonic wave reflected and returned from the user 400. Through the sensing operation, the ultrasonic sensors 300-3 measure the distance to the user 400 and determine the location of the user 400 through the distance. The sensing of the ultrasonic wave is performed in real time, and thus swimming speed and swimming record information of the user may be obtained by measuring the distance to the user through the obtained information. The ultrasonic sensors 300-3 transmit the sensing information to the display apparatus 100 or the user terminal apparatus 200.

As illustrated in FIGS. 2 to 4, the display apparatus 100 may be installed on the inner wall of the swimming pool. Further, the user terminal apparatus 200 may be installed on a wall of the swimming place. Although in FIGS. 3 and 4 the sensor contains multiple magnetic sensors 300-2 or ultrasonic sensors 300-3, respectively, this is merely an example, and a swimming system 1000 according to an exemplary embodiment may contain only a single sensor, or multiple types of sensors.

Figure 5:
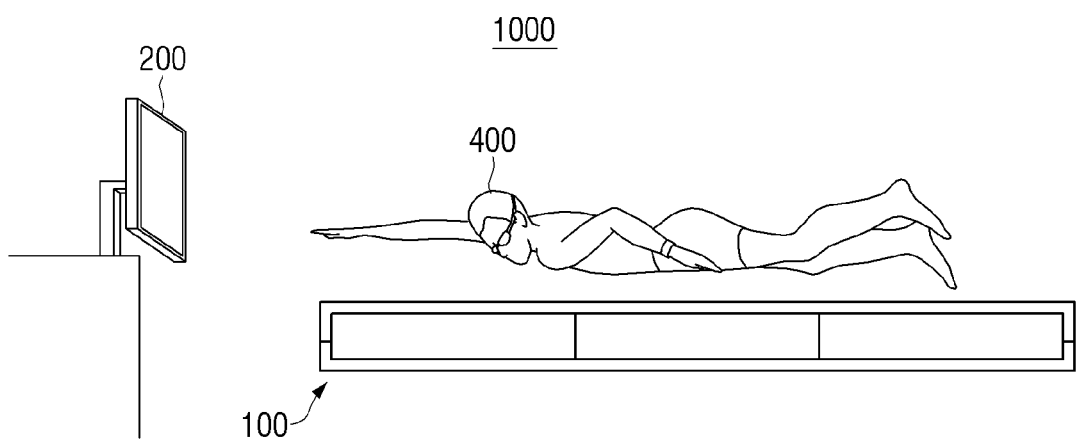
FIG. 5 is a view illustrating a swimming system including a user terminal apparatus according to another exemplary embodiment.

FIG. 5 is a view illustrating a swimming system including a user terminal apparatus according to another exemplary embodiment.

As illustrated in FIG. 5, the user terminal apparatus 200 may be installed on a wall of the swimming place. The user may simply select a desired swimming image, and information such as a swimming record and swimming speed of the user, and swimming speed and a swimming record of the swimming image described above may be displayed in the user terminal apparatus 200.

Figure 6:
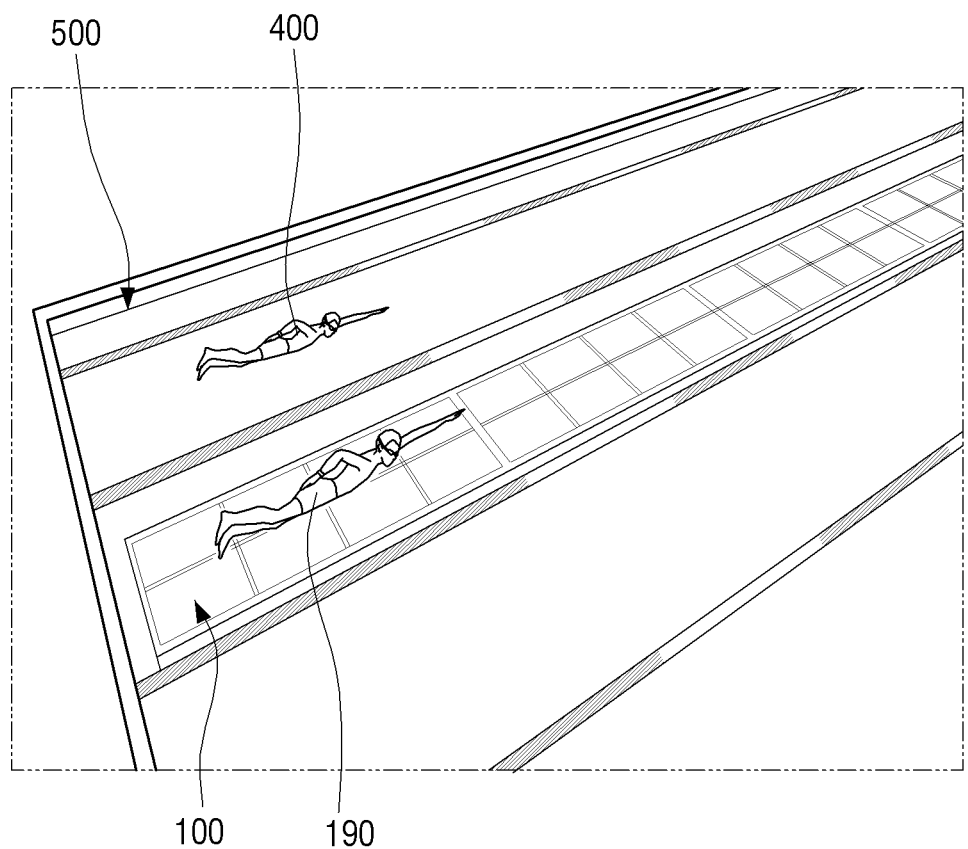
FIG. 6 is a view illustrating an operation of a swimming system according to an exemplary embodiment.

FIG. 6 is a view illustrating an operation of a swimming system according to an exemplary embodiment.

When an image is selected, the selected image 190 is displayed in the displayed apparatus 100 installed in a bottom of a swimming pool 500. While a user 400 swims, the user 400 may view the displayed swimming image 190. The displayed swimming image may be an image of another user swimming, and the first user may have a similar experience that the other user 400 actually races with the user. Further, while the other user 400 races, the display apparatus 100 or the user terminal apparatus 200 may display information such as swimming speed, or a time record. The swimming image may be captured with a camera of the swimming system 1000. The swimming image may be an image of the user captured by a camera.

Further, different display apparatuses may be installed in lanes of the swimming pool. A plurality of display apparatuses installed in the lanes may operate independently. Therefore, the plurality of display apparatuses may entirely output the same image, or may display different individual images. For example, a display apparatus in a first lane of the swimming pool may display a swimming image of a first swimmer, and a display apparatus in a second lane of the swimming pool may display a swimming image of a second swimmer different from the first swimmer.

A separate sensor may be located on a side wall of the swimming pool 500. A swimming start and a swimming end of the user may be checked through the sensor. The sensor attached to the wall of the swimming pool may be implemented with at least one among a physical button, a press sensor, an ultrasonic sensor, and a magnetic field sensor.

A separate sensor may be attached to the body of the user. At this time, the sensor attached to the body of the user may sense state information (for example, a body temperature, a heart rate or the like), and transmit the sensed information to the display apparatus 100 or the user terminal apparatus 200.

The display apparatus 100 or the user terminal apparatus 200 may display the information sensed from the body of the user, and thus provide further pieces of information.

Figure 7:
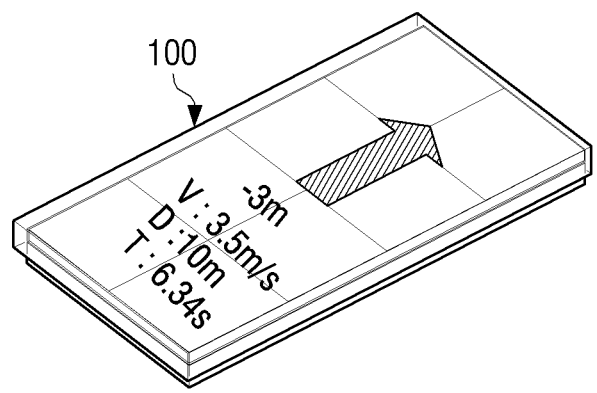
FIG. 7 is a view illustrating information displayed in a display apparatus installed in a swimming pool according to an exemplary embodiment.

FIG. 7 is a view illustrating information displayed in the display apparatus 100 installed in a swimming pool according to an exemplary embodiment.

As illustrated in FIG. 7, the display apparatus 100 within the swimming pool may display a swimming direction of the user by an arrow. Further, the display apparatus 100 may display at least one piece of information among a distance difference between the user and the other party, speed, a current distance swam, a duration between a start time and a current time, an estimated end time, a time difference between the user and the other party, calculated based on a grasped result of a location of the user. The location of the user may be determined by analyzing an image captured through the camera 300-1, or using the sensing apparatus 300 including various sensors.

The above-described information may be provided to the user when there is a distance difference between the user and a swimmer in a displayed image, and may be displayed in a region near the location of the swimming user in the display apparatus 100. In one exemplary embodiment, the information may be displayed in the display apparatus 100 installed in a lane in which the user swims. In general, since persons swim while looking at a bottom of a swimming pool, the method may improve discrimination of the information.

The exemplary embodiment of FIG. 7 displays the swimming direction of the user by an arrow, and illustrates that the current speed V is 3.5 meters per second (m/s), a distance D is 10 meters (m), and time T is 6.34 s. As illustrated, the swimming user is 3 meters behind the image.

Figure 8:
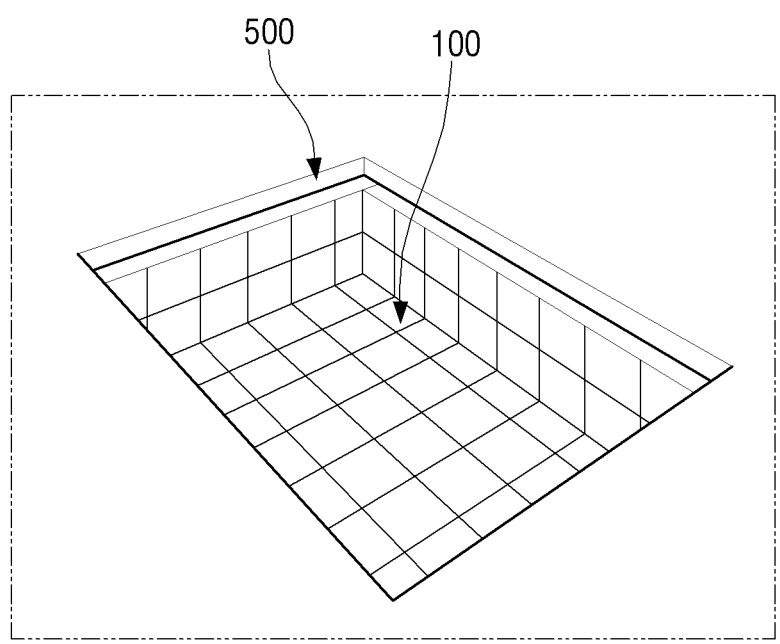
FIG. 8 is a view illustrating a display apparatus which is installed on an inner wall of a swimming pool of a swimming place and displays an image according to an exemplary embodiment.

FIG. 8 is a view illustrating the display apparatus 100 which is installed on an inner wall of a swimming pool of a swimming place and displays an image according to an exemplary embodiment.

As illustrated in FIG. 8, the display apparatus 100 may be installed on at least one of an inner wall or a floor of a swimming pool 500 of a swimming place in a grid form. Therefore, while the user swims, the user may watch the image, and the appearance of the swimming area may be improved.

Figure 9:
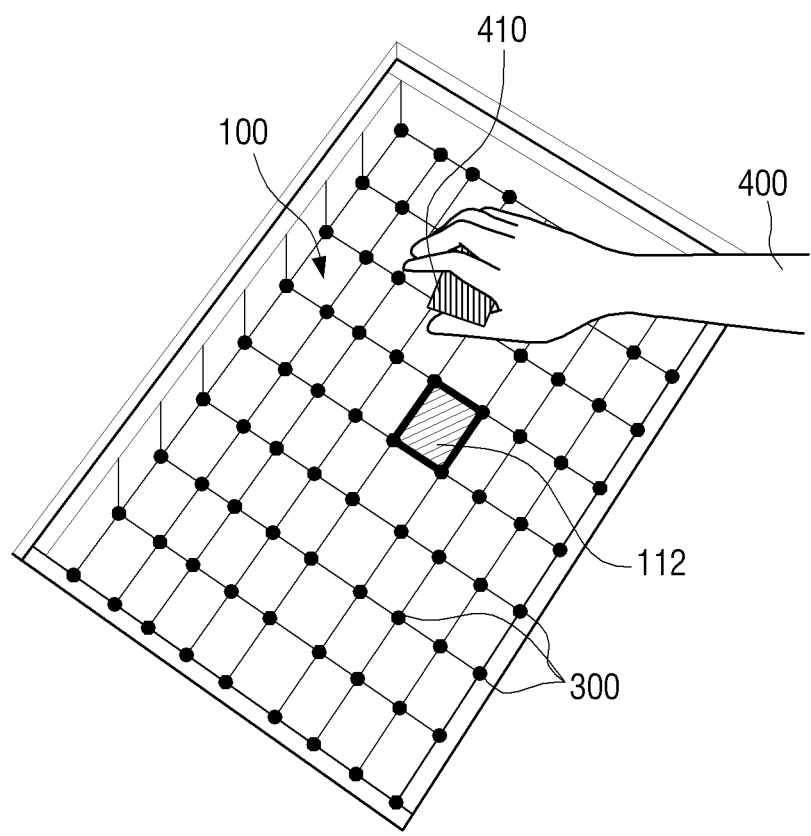
FIG. 9 is a view illustrating an operation of a swimming system in which display apparatuses including sensors arranged in a grid form according to an exemplary embodiment.

FIG. 9 is a view illustrating an operation of a swimming system in which display apparatuses including sensors installed in a grid form according to an exemplary embodiment.

As described above, the swimming system 100 according to an embodiment may include sensors 300. The sensors 300 may be magnetic field sensors, and sense change in a magnetic field by an object 410 having a magnetic tag. In response to the object 410 (for example, a magnetic card) having a magnetic tag being located in front of the magnetic sensor (not shown), the magnetic field sensors sense changes in a magnetic field.

At this time, a preset object may be displayed in a certain display region 112 of the display apparatus 100 corresponding to a region in which the object 410 is located. Specifically, the preset object is displayed in the region 112 on a display unit, in which a vertical line from a location of the object 410 toward the display apparatus 100 meets the display unit of the display apparatus 100. The preset object indicates that the object which causes change in the magnetic field is located in front of the region 112.

Alternatively, the display apparatus may be implemented so that the display is turned on only in a portion corresponding to the region in which the object is located, and the display may be turned off in the other portions.

Hereinafter, a structure of the display apparatus 100 will be described in detail.

Figure 10:
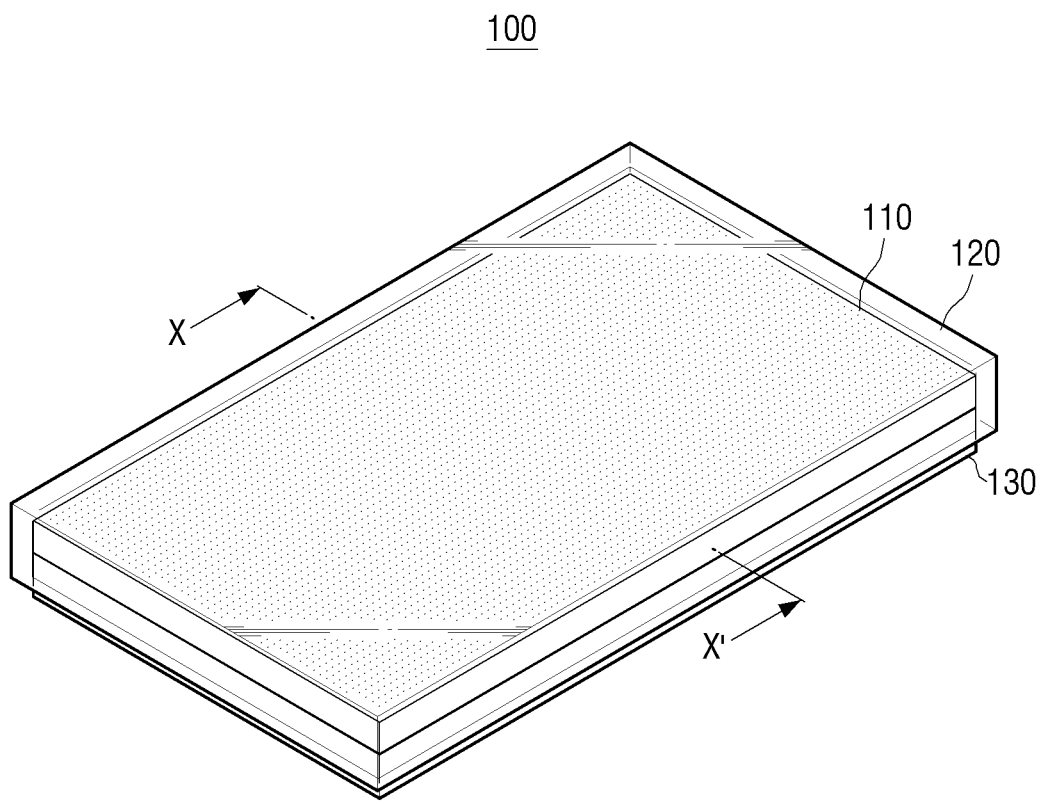
FIG. 10 is a perspective view illustrating a display apparatus according to an exemplary embodiment.
Figure 11:
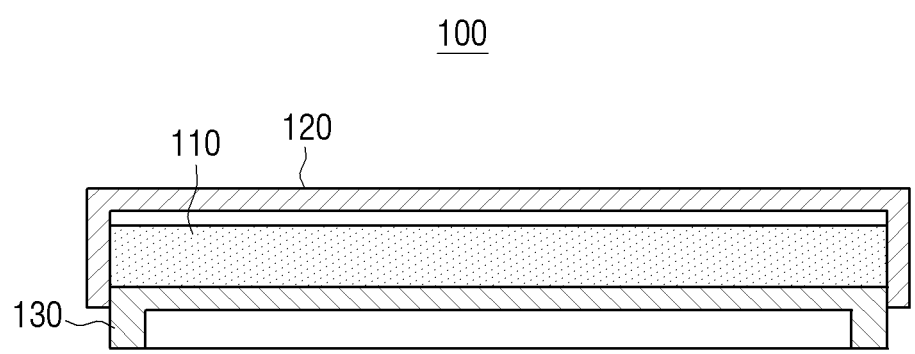
FIG. 11 is a cross-sectional view illustrating the display apparatus taken along line X-X' of FIG. 10.

FIG. 10 is a perspective view of the display apparatus 100 according to an exemplary embodiment, and FIG. 11 is a cross-sectional view of the display apparatus 100 taken line X-X' of FIG. 10.

Referring to FIGS. 10 and 11, the display apparatus 100 according to an exemplary embodiment includes a display unit 110, a transparent member 120, and a frame unit 130.

Since the display apparatus 100 may be installed under water, the display apparatus 100 is waterproofed. To this end, the display apparatus may have the structure as illustrated in FIGS. 10 and 11.

The display unit 110 is configured to display an image. The display unit 110 is received in an inner space formed by the transparent member 120 and the frame unit 130 as illustrated in FIGS. 10 and 11. Since liquid is not penetrated into the inner space, the liquid does not reach the display unit 110 received in the inner space. Therefore, even when the display 100 is not waterproof, the function of the display unit 100 is not damaged. However, this is only an example and the display itself may be waterproofed.

The display unit 110 includes a display panel and a hardware (not shown) to output an image. The hardware may be implemented to be installed outside of the inner space to provide only image information to the display panel in the inner space. Alternatively, the hardware and the display panel may both be configured to be installed in the inner space.

The display unit 110 includes the display panel configured to display an image. The display panel may be implemented with various display techniques such as an organic light emitting diode (OLED), a liquid crystal display (LCD) panel, a plasma display panel (PDP), a vacuum fluorescent display (VFD), a field emission display (FED), or an electro luminescence display (ELD). The display panel may typically be an emissive display type, but the display panel may have a reflective display type such as E-ink, P-ink, or photonic crystal. Further, the display panel may be implanted with a flexible display, a transparent display, or the like.

The configuration to output the image may include a timing controller (not shown), a gate driver (not shown), a data driver (not shown), and a voltage driver (not shown).

The timing controller generates a gate control signal (scanning control signal) and a data control signal (data signal), and rearranges input R, G, and B data and provides a rearrangement result to the data driver.

The gate driver applies gate on/off voltages (Vgh/Vgl) provided from the voltage driver to the display panel 110 according to the gate control signal generated by the timing controller.

The data driver completes scaling and input R, G, and B data of an image frame to the display panel according to the control signal generated by the timing controller.

The voltage driver generates driving voltages and transmits the driving voltages to the gate driver, the data driver, and the display panel.

The implementation of various displays is known in the art. Therefore, a detailed description will not be provided so that the detailed description of one or more exemplary embodiments will not be obscured.

The display apparatus 100 may be implemented as a video wall, the display unit 110 may simultaneously display the same image or individually display different images by connecting a plurality of display panels which will be described later in FIGS. 12 and 13.

The transparent member 120 covers a front of the display unit 110. At this time, a side of the display unit 110 is covered with the frame unit 130 to be described later, and a top of the frame unit 130 and a bottom of the transparent member 120 are tightly coupled. Therefore, liquid is stopped from permeating the inner space.

As illustrated in FIGS. 10 and 11, the transparent member 120 may cover the front of the display unit 110 as well as a side of the display unit 110. At this time, the transparent member 120 may be integrally implemented to have a depressed space therein. The space receives the display unit 130.

Since the transparent member 120 has a transparent property, an image displayed in the display unit 110 may be viewed through the transparent member 120. The transparent member may be formed of a material to endure water pressure, such as reinforced plastic or tempered glass.

The frame unit 130 fixes to at least one of the display unit 110 and the transparent member 120. The frame unit 130 may be formed of a material having high strength such as metal or plastic. If the frame unit 130 formed of the metal, the frame unit 130 may be configured so that water flows outside the frame unit 130 to provide a water-cooling effect to the display apparatus 100.

Further, the frame unit 130 installed with the display unit 110 under same swimming pool, the frame unit 130 may include a member configured to affix the display apparatus 100 to a fixture under water.

The frame unit 130 and the transparent member 120 are tightly coupled to prevent liquid from entering the inner space. In one exemplary embodiment, waterproof silicon may be molding-processed in a portion in which the frame unit 130 and the transparent member 120 are coupled.

Figure 12:
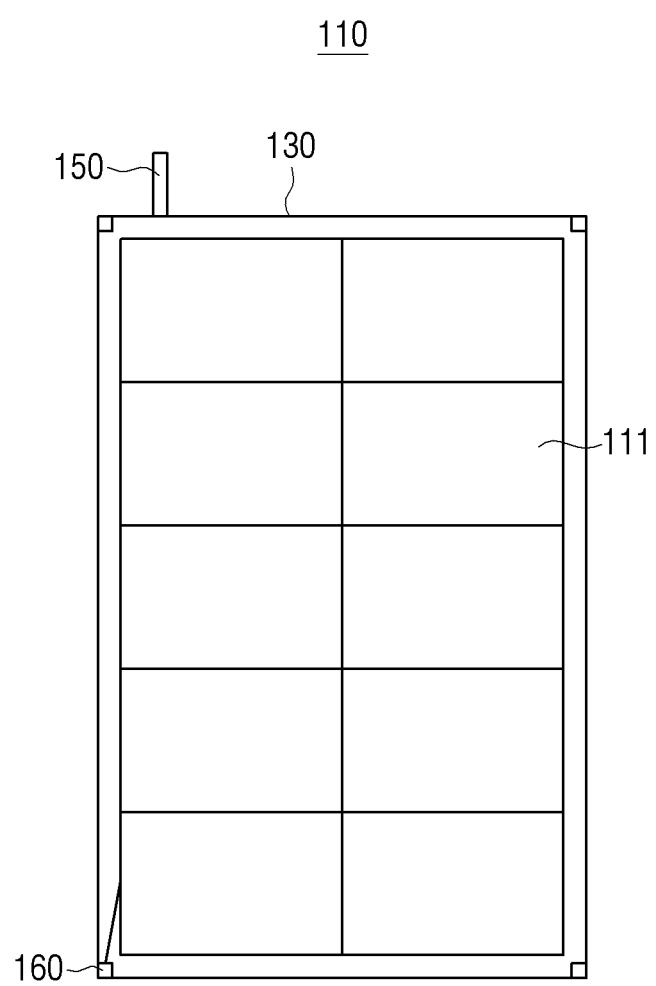
FIG. 12 is a view illustrating a display apparatus having a plurality of display panels according to an exemplary embodiment.

FIG. 12 is a view illustrating a display apparatus having a plurality of display panels according to an exemplary embodiment.

As illustrated in FIG. 12, a display unit 110 of a display apparatus 100 may include a plurality of display panels 111. The plurality of display panels 111 may display a single image or a plurality of individual images, and thus the display apparatus 100 may operate like a video wall. The display apparatus 100 includes a line configured to transfer a driving signal. A configuration of a driving signal circuit is not shown.

Further, the display apparatus 100 may include a leak sensor 160 configured to detect water entering the inner space formed by the frame unit 130 and the transparent member (see 120 of FIG. 11). The leak sensor 160 may detects that external liquid permeates a space in which the display unit 110 is located, and transmits detected information to a controller (not shown) or the display unit 110 in response to detecting the liquid permeating the space. The display unit 110 may display information indicating that water leak occurs. For example, the display unit may display a message such as "occurrence of water leak" or an image indicating the water leak.

FIG. 13 is a view illustrating an example in which a display unit 100 inserted into an inner space formed by a transparent member 120 and a frame 130. As illustrated in FIG. 13, the display unit 110, specifically, one or more display panels may be inserted into the inner space between the transparent member 120 and the frame unit 130. As illustrated in 1300A, 1300B, and 1300C, at least one display panel may be inserted into the inner space and may be extracted from the inner space for the purpose of repair or replacement.

Hereinafter, a swimming method according to an exemplary embodiment will be described.

Figure 14:
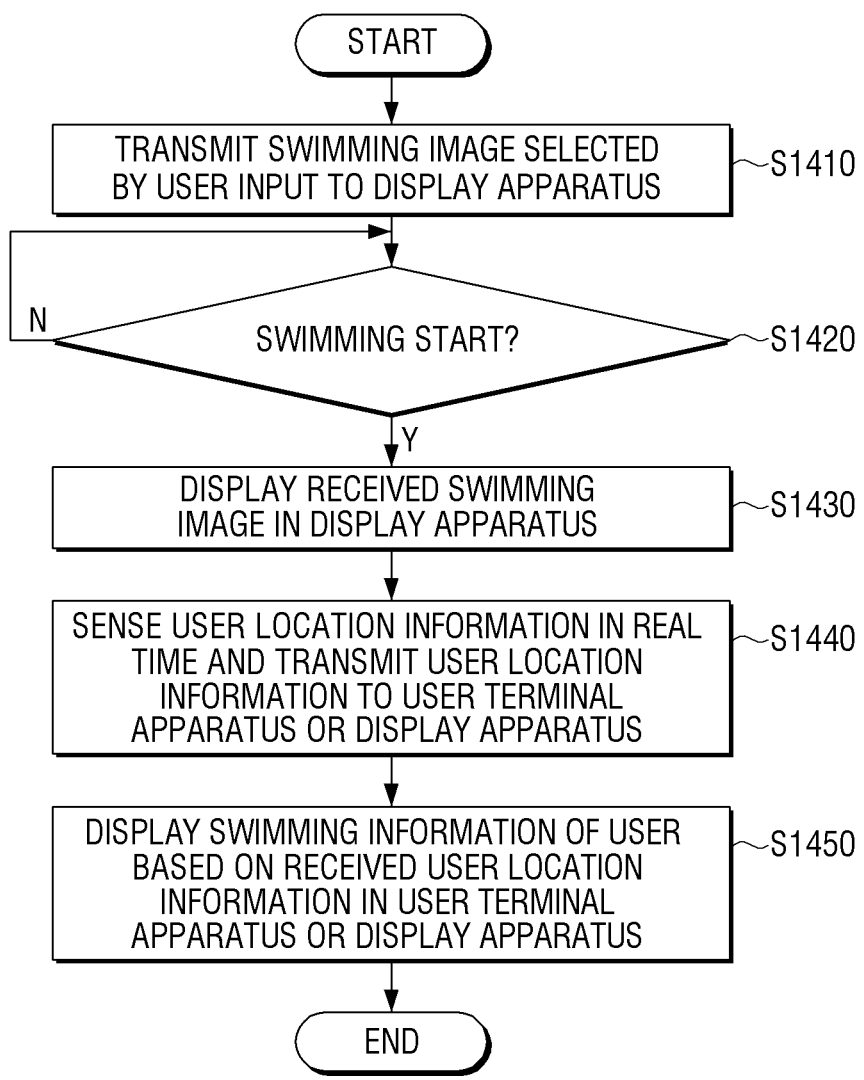
FIG. 14 is a flowchart illustrating a display method according to an exemplary embodiment.

FIG. 14 is a flowchart illustrating a swimming method according to an exemplary embodiment.

Referring to FIG. 14, according to the swimming method according to an exemplary embodiment, first, a user terminal apparatus transmits a swimming image selected by a user input to a display apparatus (S1410). In response to starting of swimming (S1420-Y), the display apparatus reproduces the swimming image received from the user terminal apparatus (S1430). A sensing apparatus senses location information of the user in real time, and transmits the user location information to the user terminal apparatus or the display apparatus (S1440). The user terminal apparatus or the display apparatus displays a swimming record information of the user based on the received user location information (S1450).

The sensing of the user location information may be performed using at least one among a camera configured to capture a location of the user, a magnetic field sensor configured to sense a magnetic tag worn by the user, and an ultrasonic sensor configured to sense an ultrasonic wave reflected from the body of the user.

The user terminal apparatus or the display apparatus may calculate a recording time of the user based on the received user location information, and display the calculated recording time.

The user terminal apparatus or the display apparatus may calculate comparative data by comparing a recording time corresponding to the swimming image selected by the user input with the recording time of the user calculated based on the received user location information, and display the calculated comparative data.

The display apparatus may be installed on an inner wall of a swimming pool, and the user terminal apparatus may be installed on a wall of the swimming place.

Figure 15:
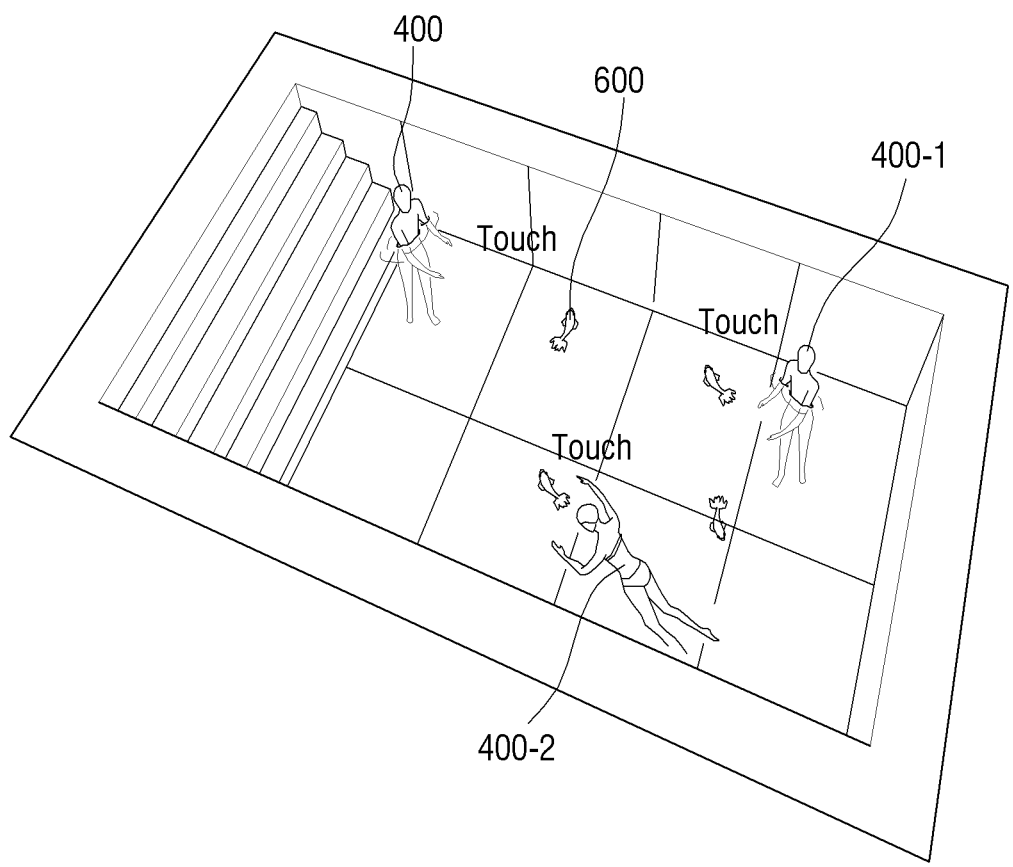
FIG. 15 is a view illustrating a gaming method using a display apparatus according to an exemplary embodiment.

FIG. 15 is a view illustrating a method of playing a game using a display apparatus according to an exemplary embodiment.

Users 400, 400-1, and 400-2 play various games using a display apparatus 100. For example, as illustrated in FIG. 15, the users 400, 400-1, and 400-2 may play a game of catching fish 600. The fish 600 are displayed on a screen of the display apparatus 100. The display apparatus 100 may sense locations of the user objects, such as user hands and feet, and determine that the user catches the fish 600 to the location of the user object being matched with a region in which the fish 600 is displayed. The display apparatus 100 may keep count of the number of fish caught by each user.

Hereinafter, a method of managing water quality according to an exemplary embodiment is described.

Figure 16:
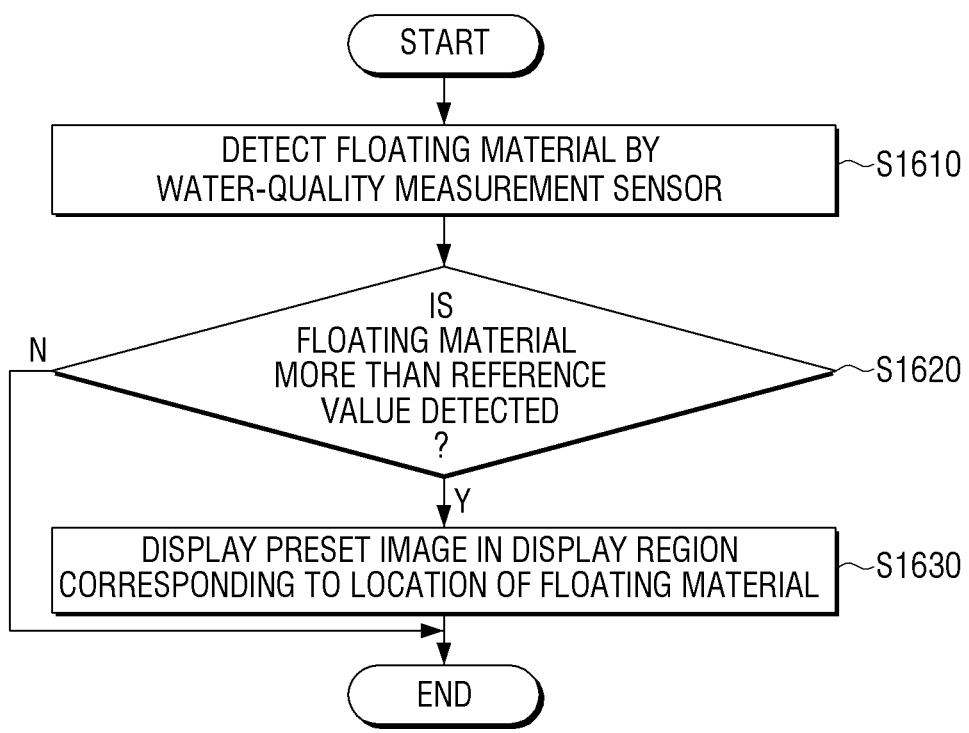
FIG. 16 is a flowchart illustrating a method of managing water quality according to an exemplary embodiment.

FIG. 16 is a flowchart illustrating a method of managing water quality according to an exemplary embodiment.

Referring to FIG. 16, according to the method of managing water quality according to an exemplary embodiment, first, a water-quality measurement sensor detects a floating material (S1610). The water-quality measurement sensor transmits information for the detected floating material to a display apparatus or a user terminal apparatus. The display apparatus or the user terminal apparatus determines whether or not the floating material is more than a reference value (S1620). In response to determining the location in which the detected floating material is more than the reference value (S1620-Y), the display apparatus displays a preset image in a display region of the display apparatus corresponding to a location of the floating material (S1630).

Alternatively, the preset image may be displayed in a separate display apparatus out of water.

The water-quality measurement sensor may include at least one sensor selected from the group consisting of a pH sensor, a thermometer, a bio sensor, and an ultrasonic sensor. If the sensor includes the ultrasonic sensor, the ultrasonic sensor may be installed on a wall of a swimming pool of a swimming place and used to determine a location of the floating material in a water surface. At this time, the location of the floating material may be more accurately detected.

The displaying may include changing color of the display region of the display apparatus corresponding to the location. In addition, the displaying may include displaying specific images.

Figure 17:
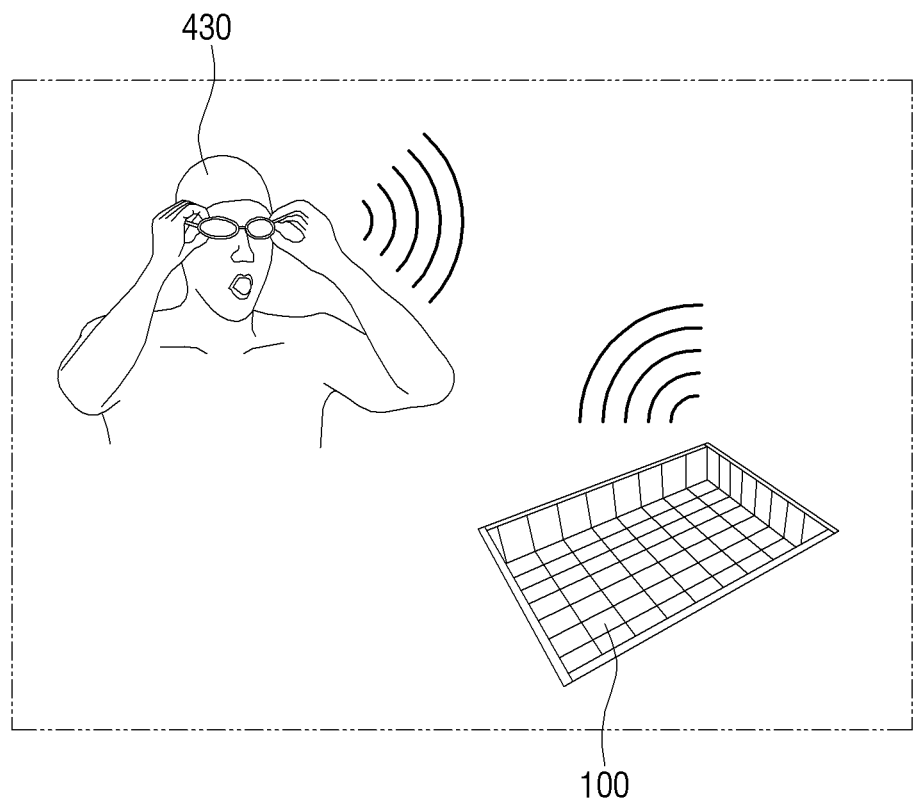
FIG. 17 is a view illustrating a display apparatus which enables three-dimensional (3D) display.

FIG. 17 illustrates a display apparatus which enables three-dimensional (3D) display according to an exemplary embodiment.

As illustrated in FIG. 17, the display apparatus 100 may be implemented to enable 3D image display. In one exemplary embodiment, the display unit 110 may be implemented in a shutter glass type. At this time, the display unit 110 converts a frame rate and alternately display a left-eye image and a right-eye image. At this time, swimming goggles 430 includes shutter glasses. That is, the swimming goggles 430 may be designed so that transmittance of light polarized to a specific direction according to orientation of LC becomes changed. The swimming goggles 430 may alternately transmit the left-eye image and the right-eye image by alternately fast opening off a left-eye lens and a right-eye lens. The swimming goggles 430 and the display apparatus 100 need to be synchronized with each other, and a communication channel configured to transmit/receive a synchronization signal is formed. Through the above-described exemplary embodiment, the user may watch a 3D image while swimming.

The foregoing exemplary embodiments and advantages are merely exemplary and are not to be construed as limiting the present inventive concept. The exemplary embodiments can be readily applied to other types of devices. Also, the description of the exemplary embodiments is intended to be illustrative, and not to limit the scope of the claims, and many alternatives, modifications, and variations will be apparent to those skilled in the art.

What is claimed is:

1. A display system comprising:
    a user terminal apparatus configured to transmit a moving image of a swimmer to a display apparatus;
    the display apparatus configured to be installed on at least one of an inner wall of a swimming pool and a floor of the swimming pool, the display apparatus being configured to reproduce, underwater, the moving image of the swimmer received from the user terminal apparatus; and
    a sensing apparatus configured to sense, while a user is swimming, user location information of the user in real time, and transmit the sensed user location information to the user terminal apparatus or the display apparatus,
    wherein the user terminal apparatus or the display apparatus is further configured to display swimming information of the user based on the received user location information.

2. The display system as claimed in claim 1, wherein the sensing apparatus includes at least one selected from the group consisting of a camera configured to capture a location of the user, a magnetic field sensor configured to sense a magnetic tag worn by the user, and an ultrasonic sensor configured to sense an ultrasonic wave reflected from a body of the user.

3. The display system as claimed in claim 1, wherein the user terminal apparatus or the display apparatus is further configured to calculate one or more swimming statistics of the user based on the received user location information, and to display the calculated swimming statistics.

4. The display system as claimed in claim 3, wherein the user terminal apparatus or the display apparatus is further configured to calculate comparative data by comparing one or more swimming statistics corresponding to the moving image of the swimmer selected by the user input with the one or more swimming statistics of the user calculated based on the received user location information, and to display the calculation result.

5. The display system as claimed in claim 1, wherein the swimmer is a second user different from user.

6. The display system as claimed in claim 1, wherein the display apparatus comprises:
   at least one display unit configured to display an image;
   a transparent member configured to cover a front of the at least one display unit; and
   a frame unit configured to affix to the transparent member, forming an inner space between the transparent member and the frame unit.

7. The display system as claimed in claim 6, wherein the at least one display unit is configured to be installable into the inner space formed between the transparent member and the frame unit.

8. The display system as claimed in claim 7, wherein the at least one display unit is further configured to be removable from the inner space.

9. The display system as claimed in claim 6, wherein the transparent member comprises at least one of tempered glass and reinforced plastic.

10. A display system comprising:
    a user terminal apparatus configured to transmit a swimming image to a display apparatus;
    the display apparatus configured to reproduce the swimming image received from the user terminal apparatus, the display apparatus comprising:
      at least one display unit configured to display an image,
      a transparent member configured to cover a front of the at least one display unit, and
      a frame unit configured to affix to the transparent member, forming an inner space between the transparent member and the frame unit;
    a sensing apparatus configured to sense, while a user is swimming, user location information in real time, and transmit the sensed user location information to the user terminal apparatus or the display apparatus; and
    a leak sensor configured to detect water permeating into the inner space,
    wherein the user terminal apparatus or the display apparatus is further configured to display swimming information of the user based on the received user location information,
    wherein the at least one display unit is configured to be installable into the inner space formed between the transparent member and the frame unit.

11. A display system comprising:
    a waterproofed display configured to be installed on at least one of an interior wall and a floor of a pool;
    a sensor configured to sense, while a user is in the pool, a location of the user in real time; and
    a controller configured to control the waterproofed display and the sensor, and to change an image of a swimmer displayed on the waterproofed display based on the sensed location of the user.

12. The display system as claimed in claim 11, wherein the controller is further configured to control a movement of the image displayed on the display apparatus based on the location of the user.

13. The display system as claimed in claim 11, wherein the controller is further configured to calculate one or more swimming statistics based on the location of the user and to control the display apparatus to display the one or more swimming statistics.

* * * * *